United States Patent
Chen et al.

(10) Patent No.: US 10,681,623 B2
(45) Date of Patent: Jun. 9, 2020

(54) METHODS AND APPARATUS FOR CELL ACCESS VIA ANCHOR CARRIER

(71) Applicant: MEDIATEK Singapore Pte. Ltd, Singapore (SG)

(72) Inventors: Tao Chen, Beijing (CN); Hua-Min Chen, Beijing (CN); Pei-Kai Liao, Nantou County (TW)

(73) Assignee: MediaTek Singapore Pte. Ltd., Singaporee (SG)

( * ) Notice: Subject to any disclaimer, the term of this patent is extended or adjusted under 35 U.S.C. 154(b) by 0 days.

(21) Appl. No.: 16/246,547

(22) Filed: Jan. 14, 2019

(65) Prior Publication Data
US 2019/0150079 A1 May 16, 2019

Related U.S. Application Data

(63) Continuation of application No. PCT/CN2017/097194, filed on Aug. 11, 2017.

(51) Int. Cl.
*H04W 48/16* (2009.01)
*H04W 56/00* (2009.01)
(Continued)

(52) U.S. Cl.
CPC ......... *H04W 48/16* (2013.01); *H04J 11/0073* (2013.01); *H04J 11/0076* (2013.01);
(Continued)

(58) Field of Classification Search
CPC ............. H04W 48/16; H04W 56/0015; H04W 74/0833; H04W 48/08; H04J 11/0073;
(Continued)

(56) References Cited

U.S. PATENT DOCUMENTS

2010/0322158 A1* 12/2010 Lee .................. H04L 5/001 370/329
2014/0010200 A1 1/2014 Kwon et al. .............. 370/330
(Continued)

FOREIGN PATENT DOCUMENTS

CN 102187727 A 3/2009

OTHER PUBLICATIONS

International Search Report and Written Opinion of International Search Authority for PCT/CN2017/097194 dated Nov. 7, 2017 (11 pages).
(Continued)

*Primary Examiner* — Walli Z Butt
(74) *Attorney, Agent, or Firm* — Imperium Patent Works; Helen Mao

(57) ABSTRACT

Methods and apparatus are provided for cell access via the anchor carrier. In one novel aspect, the default bandwidth with a default subcarrier spacing in an anchor carrier is provided. The subcarrier spacing for the default bandwidth is the minimum subcarrier spacing of the numerologies supported by the system, depending on the frequency band and/or the deployment scenario. In one embodiment, one or more control information comprising SS1, SS2, RS, NR_MIB, and NR_ESI are received over the default bandwidth. In another embodiment, the Non-ESI information is received through one of Non-ESI carriers comprising a Msg4 during RACH access procedure, a dedicated channel for the UE as a user specific data scheduled by a SI-response message, and a broadcast data with a default or configurable period indicated for transmission by a SI-response message.

22 Claims, 7 Drawing Sheets

(51) Int. Cl.
  *H04J 11/00*  (2006.01)
  *H04L 5/00*  (2006.01)
  *H04W 74/08*  (2009.01)
  *H04W 48/08*  (2009.01)
(52) U.S. Cl.
  CPC ........ *H04J 11/0079* (2013.01); *H04L 5/0092* (2013.01); *H04W 56/0015* (2013.01); *H04W 74/0833* (2013.01); *H04W 48/08* (2013.01)
(58) Field of Classification Search
  CPC . H04J 11/0076; H04J 11/0079; H04L 5/0092; H04L 5/005; H04L 5/0053
  See application file for complete search history.

(56) References Cited

U.S. PATENT DOCUMENTS

| | | | | |
|---|---|---|---|---|
| 2015/0311923 | A1* | 10/2015 | Valliappan | H04W 16/14 370/338 |
| 2017/0238284 | A1* | 8/2017 | Tseng | H04L 5/001 370/329 |
| 2019/0223212 | A1* | 7/2019 | Xiao | H04W 74/006 |
| 2019/0319764 | A1* | 10/2019 | Nader | H04W 72/0453 |

OTHER PUBLICATIONS

R1-160121 3GPP TSG RAN WG1 NB-IoT Ad-Hoc Meeting, Lenovo, "On NB-IoT anchor carrier", Budapest, Hungary, Jan. 18-20, 2016 (4 pages).
R2-093982 3GPP TSG-RAN Wg2 Meeting #66bis, CMCC, "Idle mode camping and measurement for CA", Los Angeles, USA, Jun. 29-Jul. 3, 2009 (4 pages).

* cited by examiner

| Frequency band | < 6GHz | 6GHz ~ 40GHz | >40GHz |
|---|---|---|---|
| Supported system bandwidth | 5MHz, 20MHz, 80Mhz | 20MHz, 80MHz | 80MHz, 160MHz, 240Mhz |
| Minimum system bandwidth | 5MHz | 20MHz | 80MHz |
| Supported subcarrier spacing | 15Khz, 60Khz, 240Khz | 60Khz, 240Khz | 240Khz |
| Default anchor carrier bandwidth and subcarrier spacing for cell access | 5MHz@fsc=15Khz | 20Mhz@fsc=60khz | 80Mhz@fsc=240khz |

METHODS AND APPARATUS FOR CELL ACCESS VIA ANCHOR CARRIER

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2017/097194, with an international filing date of Aug. 11, 2017, which in turn claims priority from International Application No. PCT/CN2016/094938, METHODS AND APPARATUS FOR CELL ACCESS VIA ANCHOR CARRIER" filed on Aug. 12, 2016. This application is a continuation of International Application No. PCT/CN2017/097194, which claims priority from International Application No. PCT/CN2016/094938. International Application No. PCT/CN2017/097194 is pending as of the filing date of this application, and the United States is a designated state in International Application No. PCT/CN2017/097194. This application claims priority under 35 U.S.C. § 120 and § 365(c) from PCT/CN2016/094938, entitled "METHODS AND APPARATUS FOR CELL ACCESS VIA ANCHOR CARRIER" filed on Aug. 12, 2016. The disclosure of each of the foregoing documents is incorporated herein by reference.

TECHNICAL FIELD

The disclosed embodiments relate generally to wireless communication, and more particularly, to methods and apparatus for anchor carrier based cell access.

BACKGROUND

Third generation partnership project (3GPP) and Long Term Evolution (LTE) mobile telecommunication systems provide high data rate, lower latency and improved system performances. With the increasing demand for higher system capacity, radio access technology ("RAT") is one area for improvement. The new RAT ("NR") is developed for the next generation wireless system.

One of the considerations for the NR design is to secure the forward compatibility. The system design principles to ensure forward compatibility and compatibility of different features is strived for: maximizing the amount of time and frequency resources that can be flexibly utilized or that can be left blanked without causing backward compatibility issues in the future; minimizing transmission of always-on signals; and confining signals and channels for physical layer functionalities (signals, channels, signaling) within a configurable/allocable time and/or frequency resource.

In addition, the service requirements can be quite diverse for different services in 5G system. In particular, it may cause the different numerologies to support the different services for efficient transmission. For example, the URLLC characterized by the low latency may be favored by the large subcarrier spacing for the data transmission with the shorter subframe length, whereas the delay tolerant mMTC services may use the small subcarrier spacing with the longer symbol length for coverage extension by concentrating the power at a narrower channel bandwidth.

Therefore, a single access to the system for provision of multiple services potentially using different numerologies with the compact common channel/signal transmission will be beneficial for achieving the forward compatibility and efficiency.

SUMMARY

Methods and apparatus are provided for cell access via the anchor carrier. In one novel aspect, the 5G cell over the default bandwidth with a default subcarrier spacing in an anchor carrier is provided. The subcarrier spacing used in the default bandwidth is the minimum subcarrier spacing of the numerologies supported by the system, depending on the frequency band and/or the deployment scenario. In one embodiment, the UE configures an anchor carrier with a system bandwidth by in a wireless system with new RAT (NR), wherein the anchor carrier carries information and signal for cell access, receives control information via narrow-band access at the anchor carrier over a default bandwidth with a default subcarrier spacing, wherein the default bandwidth is smaller than the system bandwidth, and enables wideband access with a wide-band bandwidth for wide-band control information at the anchor carrier upon detecting one or more wide-band access conditions, wherein the wide-band bandwidth is larger than the default bandwidth and smaller than or equal to the system bandwidth.

In one embodiment, the information and signal carried in the anchor carrier comprises at least one of time synchronization signal SS1, frequency synchronization signal SS2, reference signal (RS), NR master information block (NR_MIB), NR essential system information (NR_ESI), paging, and Non-ESI. In another embodiment, SS1, SS2, RS are received over the default bandwidth. In yet another embodiment, one or more control information is received over the default bandwidth comprising NR_MIB, and NR_ESI. IN one embodiment, the NR_ESI comprises at least one of the frequency resources associated with the used numerology and the service type. In another embodiment, the Non-ESI information is received through one of Non-ESI carriers comprising a Msg4 during RACH access procedure, a dedicated channel for the UE as a user specific data scheduled by a SI-response message, and a broadcast data with a default or configurable period indicated for transmission by a SI-response message. In one embodiment, the wideband access is triggered by an indicator in a NR_MIB.

In another novel aspect, the SI information are updated. In one embodiment, SI update information is received via a broadcast SI-paging message. In another embodiment, the SI update information is received via a SI-response message in response to a SI-request message sent by the UE in a connected state.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections. The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure. Some variations of the embodiments are described. Throughout the various views and illustrative embodiments, like reference numbers are used to designate like elements. Reference will now be made in detail to some embodiments of the invention, examples of which are illustrated in the accompanying drawings.

Figure 1:
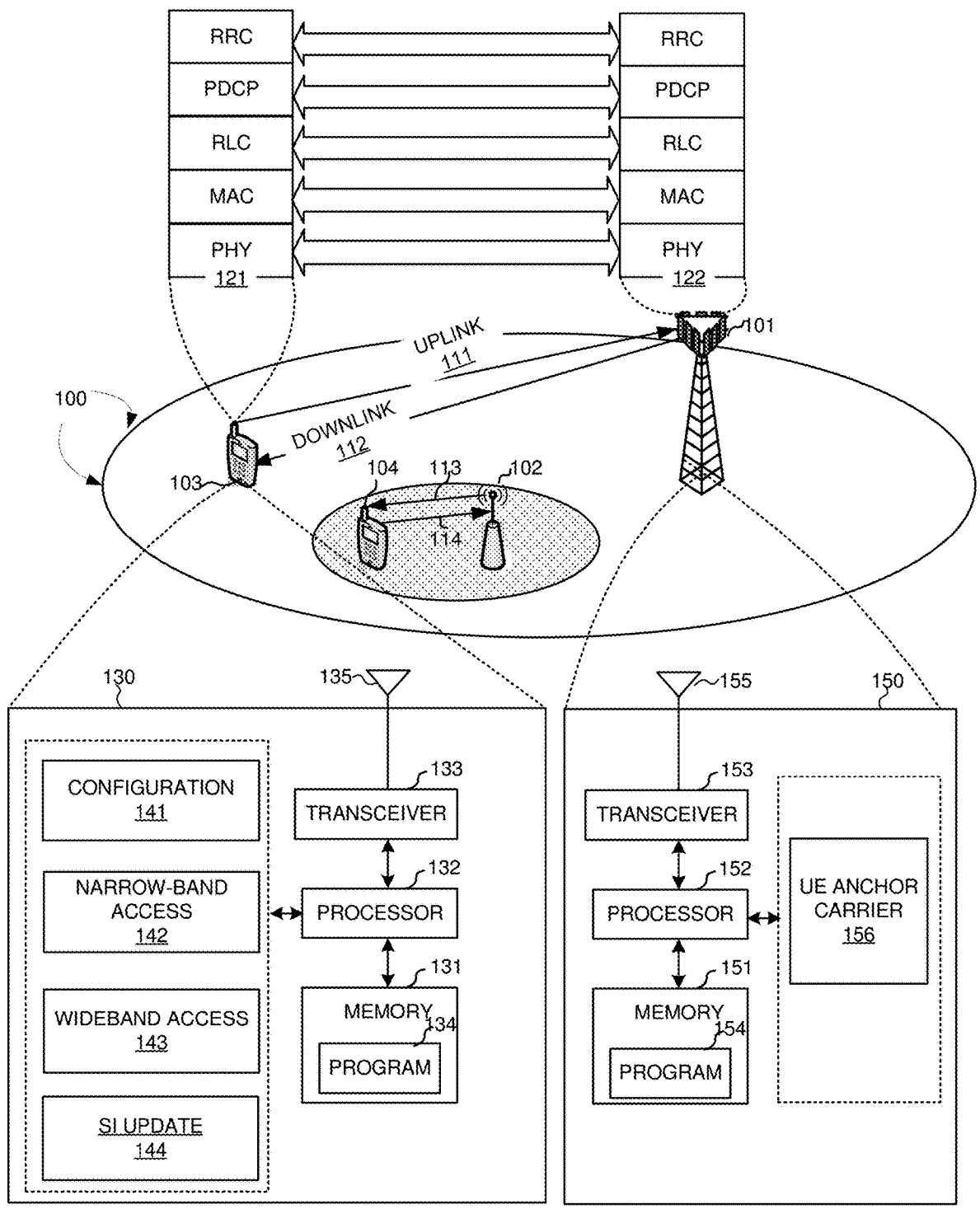
FIG. 1 illustrates an exemplary mobile communication network 100 with UEs supporting cell access via anchor channel in accordance with embodiments of the current invention.

FIG. 1 illustrates an exemplary mobile communication network 100 with UEs supporting cell access via anchor channel in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), or by other terminology used in the art. In FIG. 1, the one or more base stations 101 and 102 serve a number of remote units/user equipment (UEs) 103 and 104 within a serving area, for example, a cell, or within a cell sector. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 112 and 113 to UEs or mobile stations in the time and/or frequency domain. UEs or mobile stations 103 and 104 communicate with one or more base stations 101 and 102 via uplink communication signals 111 and 114. UE or the mobile station may also be referred to as a mobile phone, laptop, and mobile workstation and so on. In FIG. 1, the mobile communication network 100 is an OFDM/OFDMA system comprising a base station eNB 101 eNB 102 and a plurality of UE 103 and UE 104. When there is a downlink packet to be sent from the eNB to the UE, each UE gets a downlink assignment, e.g., a set of radio resources in a physical downlink shared channel (PDSCH). When a UE needs to send a packet to eNB in the uplink, the UE gets a grant from the eNB that assigns a physical uplink shared channel (PUSCH) consisting of a set of uplink radio resources. The UE gets the downlink or uplink scheduling information from a new RAT physical downlink control channel (NR-PDCCH), which is targeted specifically to new RAT UEs/mobile stations and has similar functionalities as legacy PDCCH, EPDCCH and MPDCCH. The downlink or uplink scheduling information and the other control information, carried by NR-PDCCH, is referred to as downlink control information (DCI).

FIG. 1 also shows an exemplary diagram of protocol stacks for control-plane for UE 103 and eNB 101. UE 103 has a protocol stack 121, which includes the physical (PHY) layer, the medium access control (MAC) layer, the radio link control (RLC) layer, the pack data convergence protocol (PDCP) layer, and the radio resource control (RRC) layer. Similarly, eNB 101 has a protocol stack 122. Protocol stack 122 connects with protocol stack 121. The UE-eNB protocol stack 122 includes the PHY layer, the MAC layer, the RLC layer the PDCP layer and the RRC layer, each of which connects with their corresponding protocol stack of UE protocol stack 121.

FIG. 1 further illustrates simplified block diagrams 130 and 150 UE 103 and eNB 101, respectively. UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in UE 103. Memory 131 stores program instructions and data 134 to control the operations of LC-UE 103.

UE 103 also includes multiple function modules that carry out different tasks in accordance with embodiments of the current invention. A configuration circuit 141 configures an anchor carrier with a system bandwidth, wherein the anchor carrier carries information and signal for cell access. A narrow-band access circuit 142 receives control information via narrow-band access at the anchor carrier over a default bandwidth with a default subcarrier spacing, wherein the default bandwidth is smaller than the system bandwidth. A wideband access circuit 143 enables wideband access with a wide-band bandwidth for wide-band control information at the anchor carrier upon detecting one or more wide-band access conditions, wherein the wide-band bandwidth is larger than the default bandwidth and smaller than or equal to the system bandwidth. A SI update circuit 144 receives SI update information.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes function modules that carry out different tasks in accordance with embodiments of the current invention. A UE anchor channel circuit 156 performs functions to support the cell access via anchor carrier function and communication with one or more UEs with the new UE capability enabled.

Figures 2, 3:
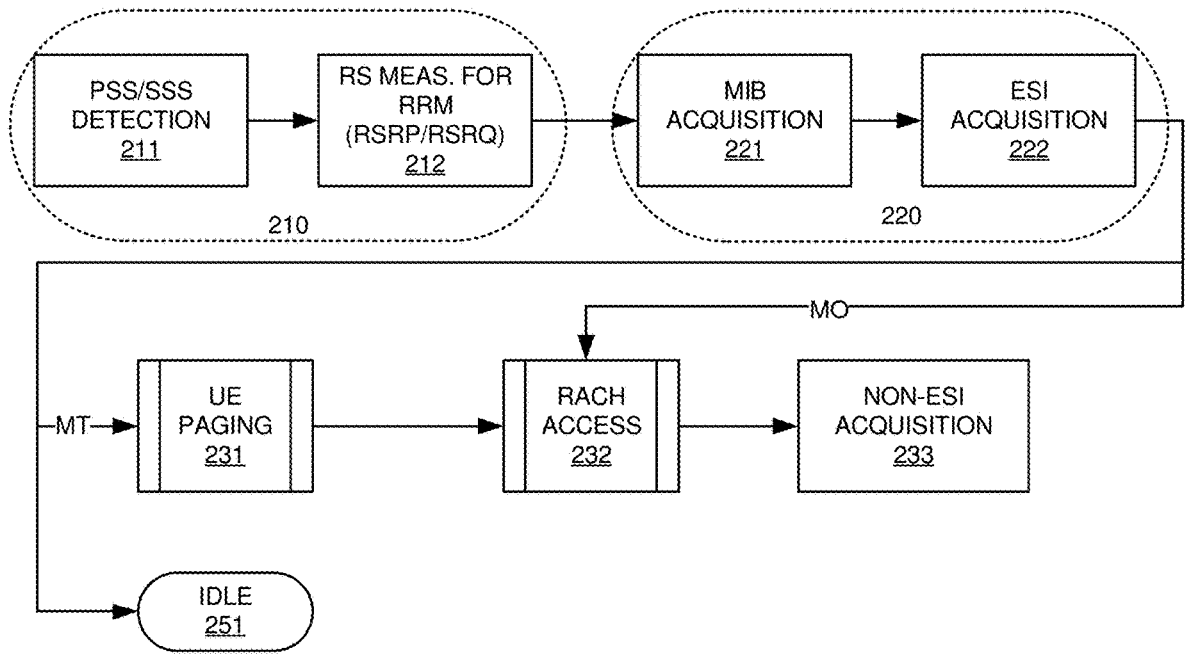
FIG. 2 illustrates an exemplary block diagram for cell access procedure with anchor carrier in accordance with embodiments of the current invention.
FIG. 3 illustrates an example the default anchor bandwidth, possible system/carrier bandwidth and subcarrier spacing assumed by UE for cell access.

FIG. 2 illustrates an exemplary block diagram for cell access procedure with anchor carrier in accordance with embodiments of the current invention. A cell access procedure starts with a cell identification process 210. The cell identification process 210 includes a PSS/SSS detection process 211 and a RS measurement for RRM measurement 212. Upon successfully acquires the synchronization at process 210, the UE moves the acquisition for information about cell access or reselection process 220. Process 220 includes a MIB acquisition process 221, and an essential system information (ESI) acquisition process 222. Once the cell access information are acquired, the UE may enter the IDLE state 251 if there is no connection request. The UE may also starts a paging process 231 upon receiving mobile terminated (MT) messages. The UE may starts the RACH access process 232 if a mobile originated (MO) messages. The UE with MT or MO process, subsequently, moves to process 233 to acquire non-ESI information.

In one novel aspect, the UE access the 5G cell over the default bandwidth with a default subcarrier spacing in an anchor carrier. The subcarrier spacing used in the default bandwidth is the minimum subcarrier spacing of the numerologies supported by the system, depending on the frequency band and/or the deployment scenario. Some information carried in the anchor carrier for the cell access as illustrated may be transmitted to the UE with the default bandwidth. The UE can get the information with a narrowband access over the default bandwidth at the anchor carrier. In one embodiment, signal and information for process 210 and 220, including a timing synchronization signal SS1, the frequency synchronization signal ss2, the reference signal (RS) for MIB, ESI, and common control. In one embodiment, the NR_MIB is also carried over the default bandwidth. For the UE in IDLE 251, periodic signal and information including SS1, SS2, RS and NR_MIB are accessed via the default bandwidth.

In one embodiment, the default subcarrier spacing is a minimum subcarrier spacing of numerologies supported by the wireless system determined by one or more parameters comprising a frequency band default subcarrier, and a deployment scenario. The anchor carrier configuration may depend on other parameters as well.

FIG. 3 illustrates an example the default anchor bandwidth, possible system/carrier bandwidth and subcarrier spacing assumed by UE for cell access. As shown, in one exemplary system configuration, different frequency band are preconfigured with different corresponding supported system bandwidth, minimum system bandwidth, supported subcarrier spacing, and default anchor carrier bandwidth and subcarrier spacing for cell access.

Figure 4:
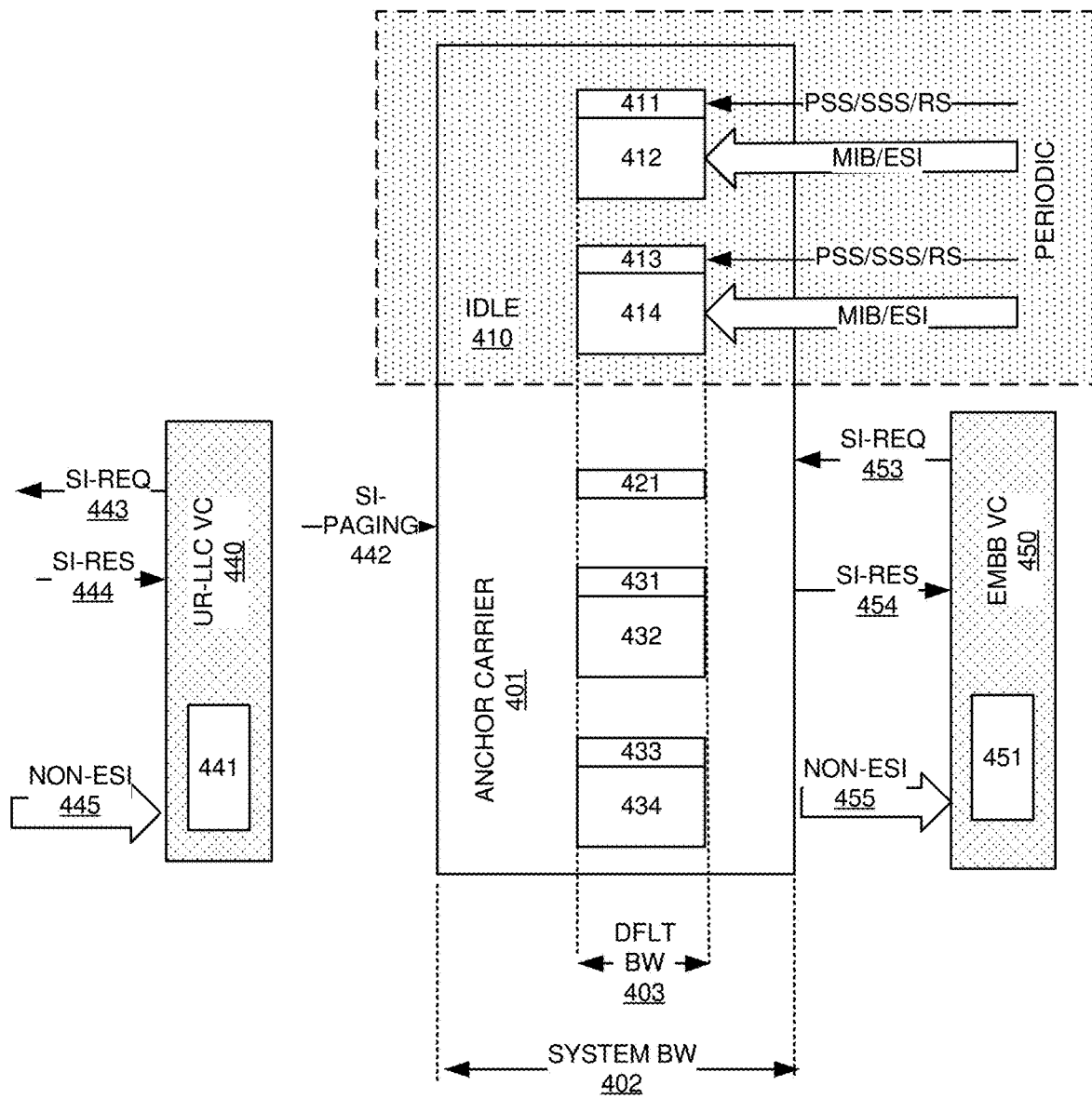
FIG. 4 illustrates procedures for the cell access and system information delivery in accordance with embodiments of the current invention.

FIG. 4 illustrates procedures for the cell access and system information delivery in accordance with embodiments of the current invention. An anchor carrier 401 has a system bandwidth 402. A default anchor carrier is also named as a common VC or central VC (CVC), which is used for NR system information transmission, such as NR-sync, NR-MIB, and/or NR-SIB is configured with a default bandwidth 403. The default bandwidth 403 is smaller than the system bandwidth 402. Block 450 denotes (virtual) carrier X-a for example, for eMBB services. Block 440 denotes (virtual) carrier X-b, for example, for ultra-reliable low-latency communications (UR-LLC) services.

In idle state 410, the UE receives PSS/SSS/RS information illustrated in blocks 411 and 413 over the default carrier. In one embodiment, UE receives NR_MIB and NR_ESI illustrated in blocks 412 and 414 over the default carrier. System information may include Master Information Block (NR_MIB), Essential System Information (NR_ESI) and non-Essential System Information (NR_Non-ESI) for New RAT (NR) system.

In one embodiment, the NR_MIB spans over four symbols associated with SS1/SS2/RS with 40 ms period for SS1/SS2. In one embodiment, the NR_MIB is carried within the default bandwidth in frequency domain at the anchor carrier. NR_MIB may carry one or more parameters about system configuration such as anchor carrier bandwidth (CVC BW), the overall aggregated system bandwidth, and/or the bandwidth for the RRM measurement with Reference Signal (RS) transmission. NR_MIB may also carry scheduling information for NR_ESI such as MCS, resource allocation and transmission time. To reduce the overhead, the MCS and resource allocation can be restricted for N_ESI. For example, in case of T=160 ms period, the starting subframe offset will be set different in NR_MIB with a cyclic shift every T period. For example, if the starting timing/subframe offset=150 ms in NR_MIB_1stTx, then: the starting timing/subframe offset=110 ms in NR_MIB_2ndTx; the starting timing/subframe offset=70 ms in NR_MIB_3rdTx; the starting timing/subframe offset=30 ms in NR_MIB_4thTx; the starting timing/subframe offset=150 ms in NR_MIB_5thTx; the starting timing/subframe offset=110 ms in NR_MIB_6thTx; the starting timing/subframe offset=70 ms in NR_MIB_7thTx; the starting timing/subframe offset=30 ms in NR_MIB_8thTx. NR_MIB_nth Tx means the nth transmission of NR_MIB over a full periodicity of NR_ESI, since NR_ESI periodicity is larger than NR_MIB, and comprises multiple NR_MIB transmissions. At each transmission, the offset value, which is carried in NR_MIB, will change to indicate the time gap between NR_ESI and NR_MIB. In this example, NR_MIB is of a transmission periodicity of 20 ms, then there is 8 NR_MIB transmissions. Assuming NR_MIB is transmitted at radio frame which fulfills $N_{SFN} \bmod T_{NR\_MIB}=0$, wherein $N_{SFN}$ is system radio frame number and $T_{NRMIB}$ is NR_MIB periodicity.

After acquisition of NR_MIB from block 210, UE can obtain the timing and frequency resources for NR_ESI transmission. NR_ESI can be either carried with the default anchor carrier bandwidth or a larger bandwidth depending on the scheduling information carried in NR_MIB.

NR_ESI can be transmitted within the default carrier bandwidth if the default carrier bandwidth is large enough to afford it. NR_ESI can be transmitted with a larger bandwidth than the default carrier bandwidth if the default carrier bandwidth is too small (or the TBS for NR_ESI is too large) to afford it. In case of a larger carrier bandwidth than the default carrier bandwidth is used for NR_ESI transmission, some gaps between NR-MIB and NR-ESI are needed for RF tuning and AGC tuning. Additionally, in addition to the default bandwidth and/or period for RS transmission, the wider bandwidth with associated period for RS transmission can be configured in NR_MIB or NR_ESI. Besides, value tag or SI information change notification can be carried in NR_MIB in a form of bitmap. It can indicate which SI is subject to change. NR_ESI may include may include the information about the frequency resources and the corresponding used numerologies in addition to the RACH/Paging configuration and some cell selection criteria carried in legacy SIB1/SIB2 messages in LTE. More specifically, NR_ESI may include a set of parameters for each numerology such as service type index (e.g., eMBB/URLLC), frequency resource information (e.g., virtual/real component carrier number), the corresponding used numerology. In addition, NR_ESI may include indication of FDD/TDD in use, Non-ESI scheduling info. Further, due to different numerology multiplexing in time domain, especially in case of DL/UL switching wherein different numerologies are used at two directions, a gap between neighbor subframes will be, and it can be carried within NR_ESI. A default subframe type indication may be also transmitted within NR_ESI. NR_ESI size may be various depending on the supported functions in NR_ESI. For different numerologies corresponding to difference services, the NR_ESI may provide different functions or parameters for each numerology.

The UE may further acquire non-ESI information. In one embodiment, the non-ESI information may be carried in the UR-LLC VC as in block 441. In another embodiment, the non-ESI information may be carried in eMBB VC as in block 451. Non-ESI information can be carried in Msg4 during RACH access procedure, or scheduled by SI-response message as the UE-specific data, or indicated/triggered for transmission by SI-response message as the broadcast data with a default or configurable period.

During RACH access procedure, Msg4 can carry Non-ESI messages. SI-response can be realized by a control channel, e.g., NR_PDCCH, which is transmitted in the control region of the subframe. SI-response can have two formats depending on whether it is used to carry the scheduling information for the dedicated user specific data about Non-ESI or just indicate the transmission of broadcast data about non-ESI. If the non-ESI is transmitted via the dedicated channel for UE, SI-response will carry the scheduling information for the corresponding dedicated data channel carrying non-ESI. If the non-ESI is transmitted via the broadcast channel for UE, SI-response can provide Ibit information to indicate whether UE should monitor a broadcast channel for acquisition of Non-ESI. The period and timing offset for the broadcast of non-ESI can be configured in NR_ESI and/or carried in SI-response. 1-bit in SI-response can be used to implicitly indicate whether SI-response is used for carrying scheduling information of dedicated data channel or presence of broadcast channel for carrying non-ESI. In case of broadcast of non-ESI, it may not be present even though the period is predefined or configured.

In one novel aspect, the connected state control information 421, control information 431 together with non-ESI information 432, and control information 433 together with UE-paging message 434 can all be carried over the default bandwidth. In another embodiment, the connected state control information, non-ESI and UE-paging message are received over the wideband access at the anchor carrier.

In another novel aspect, the SI information update is performed. In one embodiment, the SI information update is performed with SI-paging 442. The SI-paging is independent period from the UE-paging. SI-paging 442 is broadcasted to the IDLE and/or connected UEs in the system. Si-paging 442 indicates the SI modification comprising the MIB update, the ESI update, and the non-ESI updates.

In another embodiment, the SI information update is performed with SI-Request, SI-response and/or the non-ESI messages. The SI-request is illustrated, such as SI-request 443 over UR-LLC VC 440, or SI-Request 453 over eMBB VC 450. The SI-request is sent by the UE to query for any SI information updates. SI-request is sent for the connected UE. The SI-response is illustrated, such as SI-response 444 over UR-LLC VC 440, or SI-response 454 over eMBB VC 450. SI-response indicates whether there is any SI changes, including the changes of MIB and/or ESI. Once the SI-response indicates the changes of MIB and/or ESI, the UE reads the common MIB and/or ESI. SI-response also indicates whether there are changes for non-ESI. Once a change of the non-ESI is detected, the UE receives the updated non-ESI via dedicated message or the common non-ESI. In one embodiment, non-ESI is received, such as non-ESI 445 over UR-LLC VC 440 or non-ESI 455 over eMBB 450.

Figure 5:
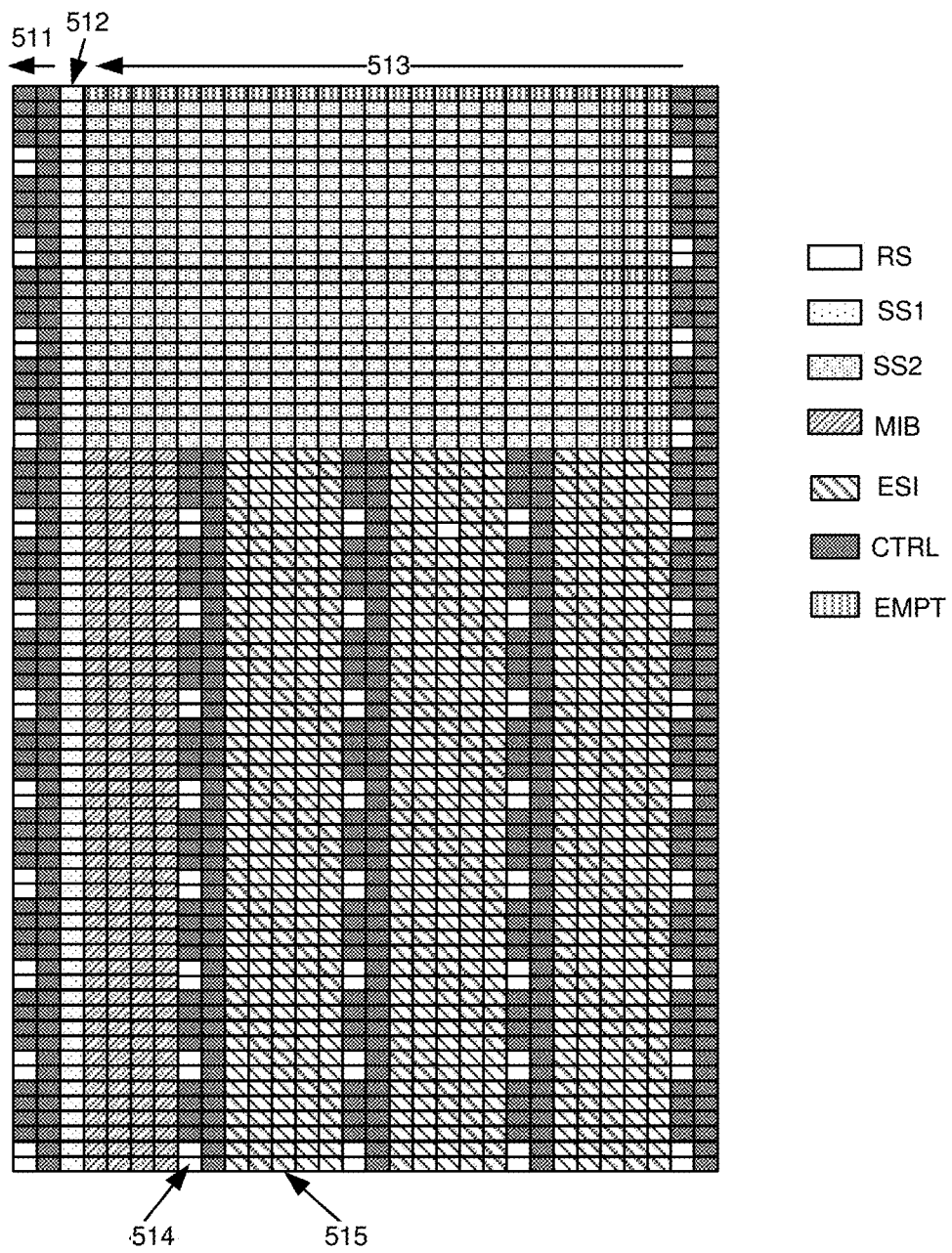
FIG. 5 illustrates the resource mapping for the channels over the wider default bandwidth in accordance with embodiments of the current invention.
Figure 5:
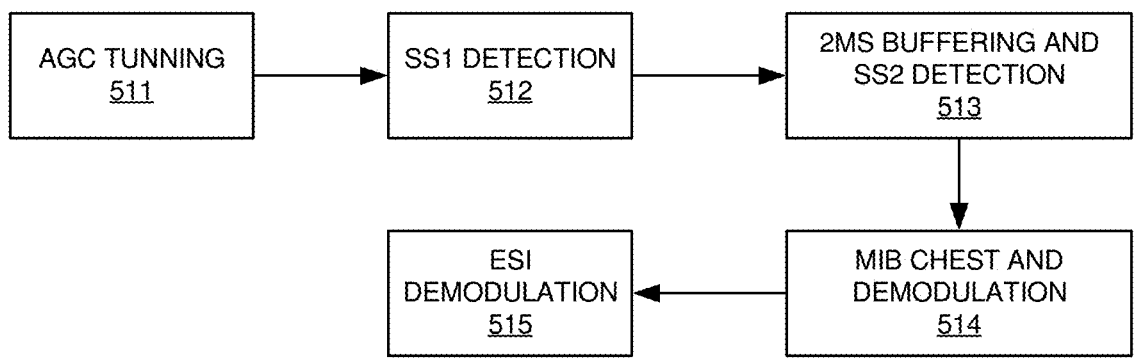

FIG. 5 illustrates the resource mapping for the channels over the wider default bandwidth in accordance with embodiments of the current invention. As an example, the 5 MHz bandwidth with one PRB is assumed as twelve subcarriers in frequency domain over seven symbols in time domain. NR_MIB is transmitted associated with SS1/SS2. For the case of two or four access points (Aps) for NR_MIB, NR_ESI, Common control channel can be assumed for support of SFBC or SFBC-FSTD. CRC masked with the number of APs with blind detection of NR_MIB can be used to determine the number of APs. NR_MIB is assumed every 40 ms supposing SS1/SS2 is transmitted every 40 ms in this example. Four symbols for symbol level repetition are used for NR_MIB transmission with support of IQ symbol combination to improve the coverage. The resources is up to twenty-three RBs with four symbols targeting the same coverage (or effective coding rate (ECR)) as LTE, i.e., up to 1104-RE over 5 MHz (=23*12*4) for carrying forty-six bits (thirty info bits+16 bit CRC). In case of only 960-RE as PBCH in LTE, there can be twenty-four info bits+16 bits CRC for total 40 bits information. TBCC or LDPC can be applied for PBCH channel to carry NR_MIB. NR_ESI can be transmitted with a period of 80 ms or 160 ms, up to NR_MIB configuration. It can be transmitted in the consecutive subframes for a large TBS to secure the compact transmission. In case of 5 MHz default bandwidth with the suitable TBS for NR_ESI, it can be carried over 5 MHz default bandwidth within a few subframes.

The procedure for initial access procedure over 5 MHz default bandwidth at UE side is also illustrated. At step 511 the UE performs AGC tuning based on RSSI measurement. At step 512, the UE performs detection of SS1 with one or two symbols for buffering. At step 513, after successful SS1 detection, 2 ms buffering at 5 MHz default bandwidth is applied for SS2 detection including NR_MIB/NR_ESI. At step 514, after successful SS2 detection, NR_MIB ChEst and demodulation can be done. At step 515, ESI demodulation with transmission span up to three subframes.

Figure 6:
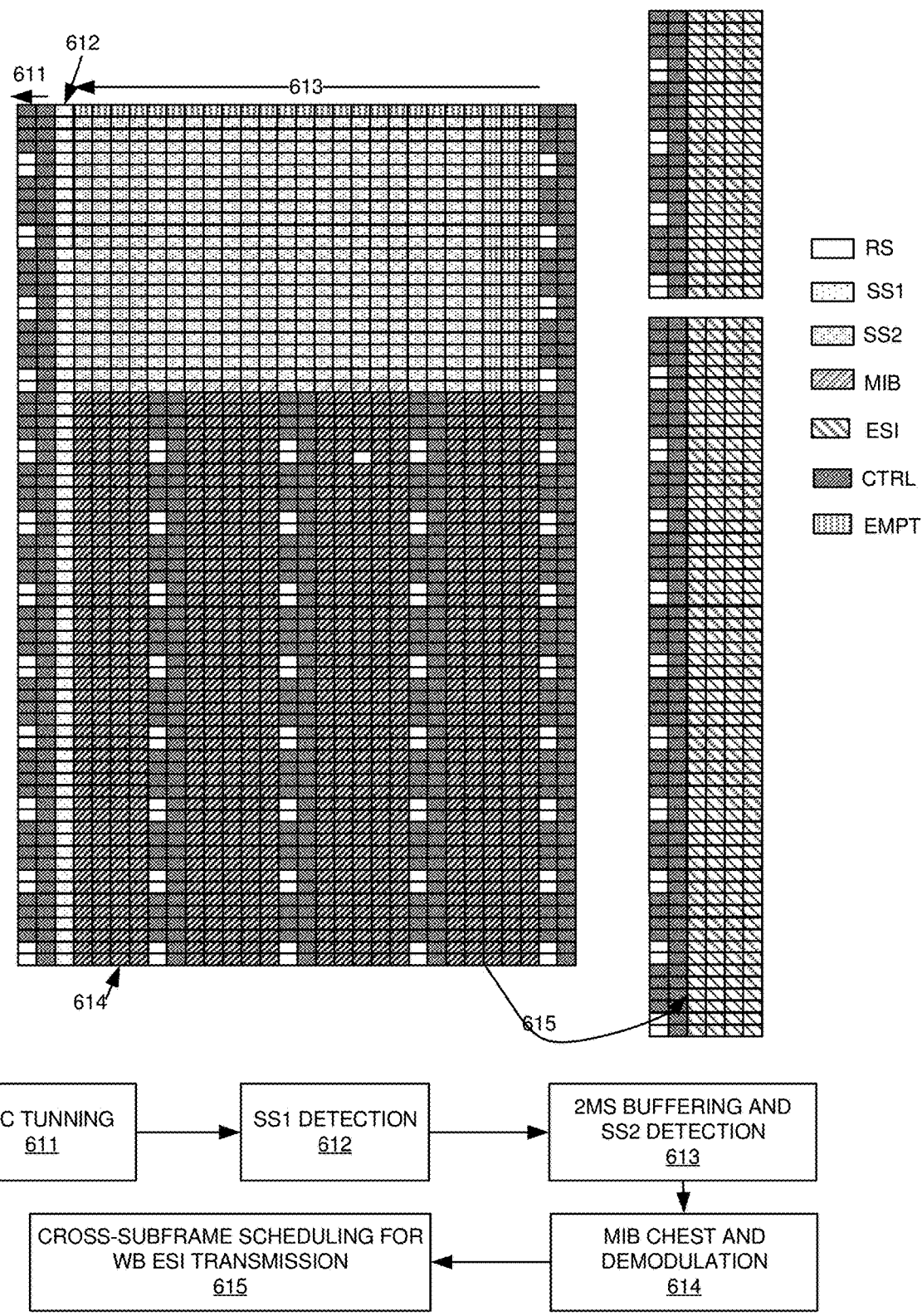
FIG. 6 illustrates the resource mapping for the channels over the narrow default bandwidth in accordance with embodiments of the current invention.

FIG. 6 illustrates the resource mapping for the channels over the narrow default bandwidth in accordance with embodiments of the current invention. In one exemplary, the 1.4 MHz bandwidth is configured. In this case, NR_MIB is transmitted in the consecutive four subframes with four symbols in the first subframes and five symbols in the remaining three subframes to achieve the same effective coding rate as LTE or 5 MHz default bandwidth case. NR_ESI is transmitted in a wider bandwidth than the default carrier bandwidth (1.4 MHz) according to the scheduling information carried in NR_MIB. Considering the potential RF tuning and UE processing time, NR_ESI cannot be transmitted immediately after NR_MIB transmission. The procedure for initial access procedure over 1.4 MHz default bandwidth at UE side is illustrated. At step 611, the UE performs AGC tuning based on RSSI measurement. At step 612, the UE performs detection of SS1 with one or two symbols for buffering. At step 613, after successful SS1 detection, 2 ms buffering@5 MHz default bandwidth is applied for SS2 detection including NR_MIB. At step 614, after successful SS2 detection, NR_MIB ChEst and demodulation can be done. At step 615, NR_MIB will (cross-subframe) schedule ESI transmission spanning over the whole system bandwidth (e.g., 20 MHz), supposing ESI with 80 ms TTI (over two Txs) and up to 600 bits. Finally, the UE tunes RF to the wider bandwidth for AGC tuning and then ESI demodulation.

Figure 7:
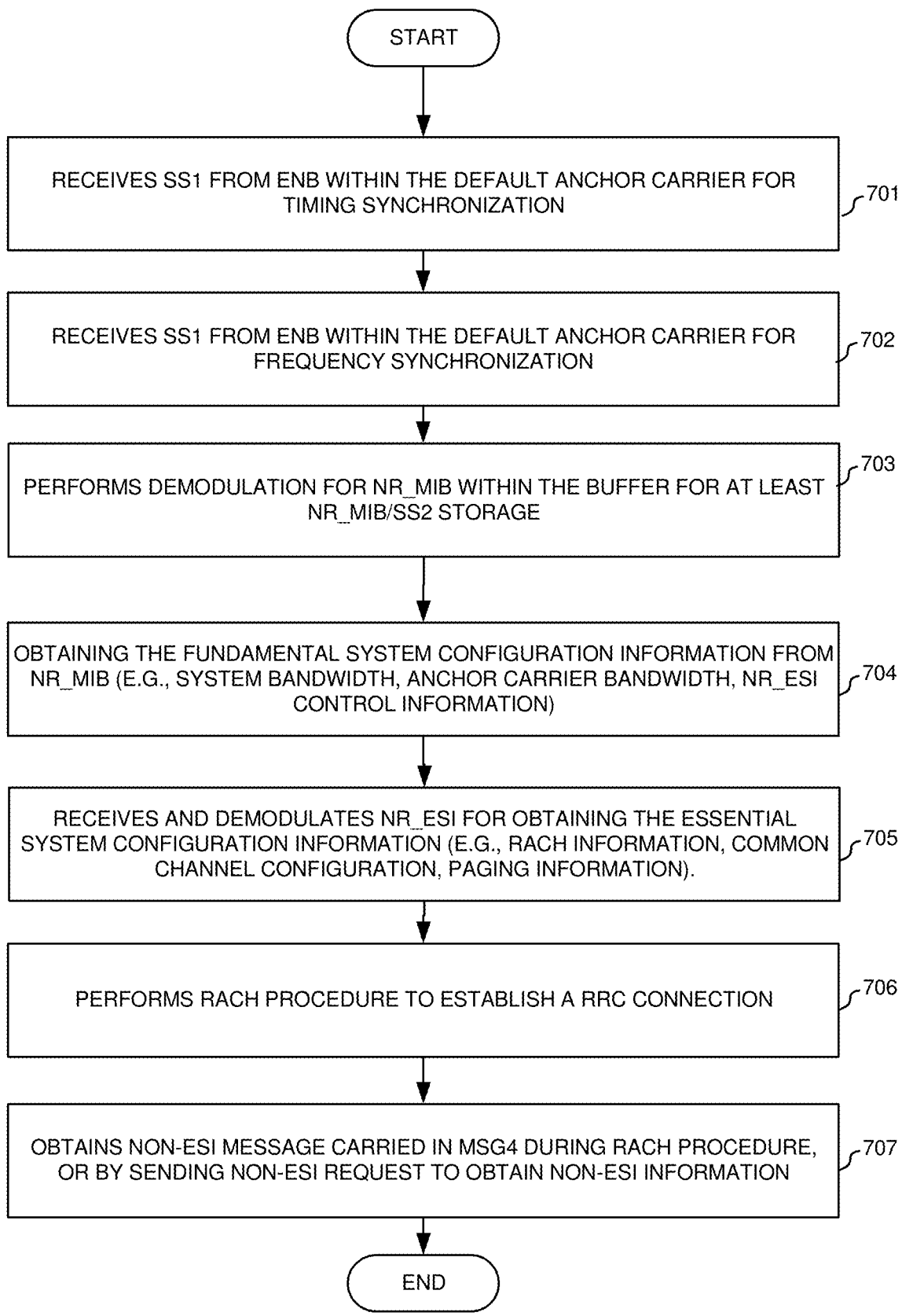
FIG. 7 illustrates the flow chat for cell access in accordance to the embodiments of the current invention.
Figure 8:
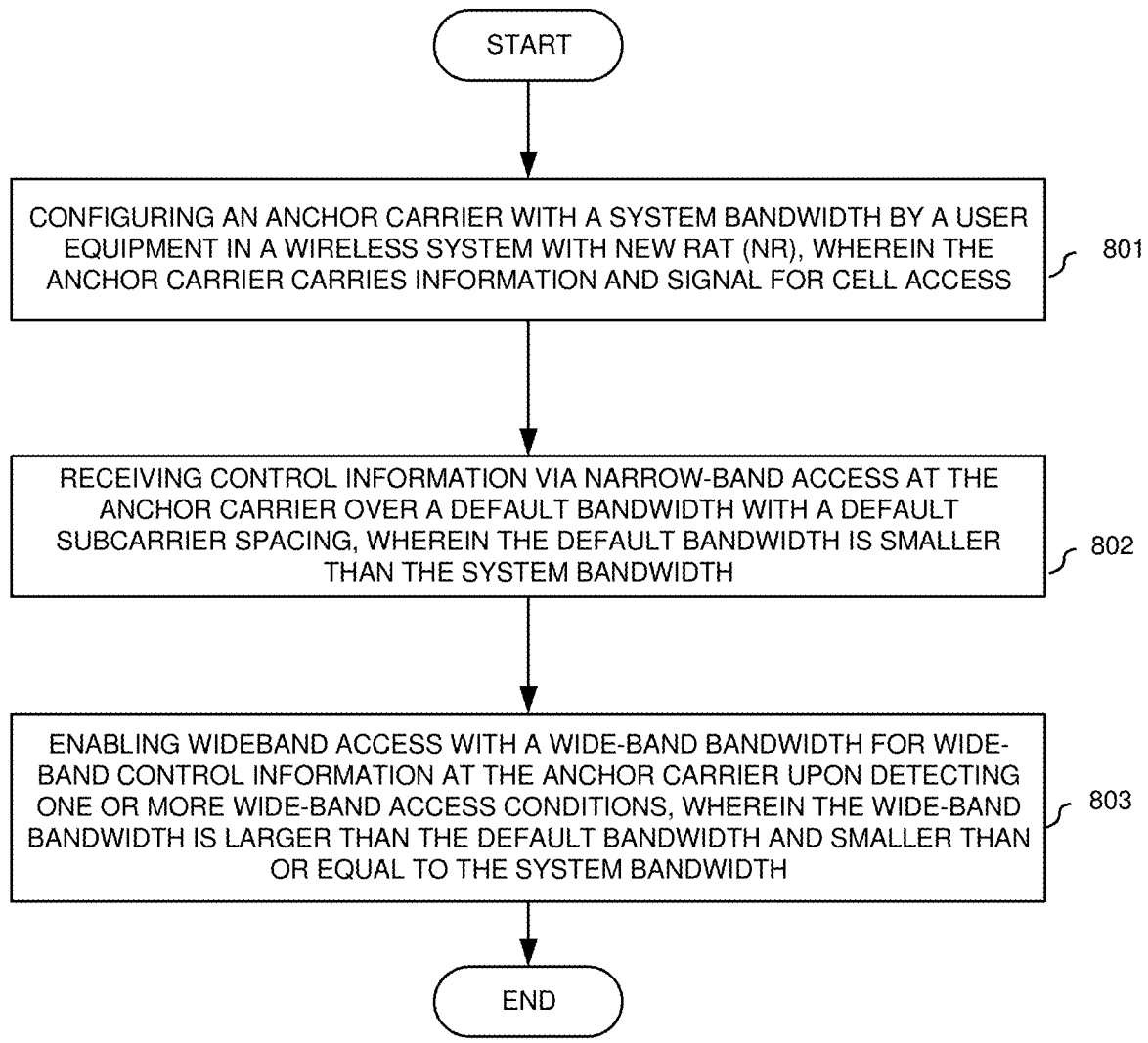
FIG. 8 illustrates an exemplary flow chart for the cell access over the anchor carrier in accordance with embodiments of the current invention.

FIG. 7 illustrates the flow chat for cell access in accordance to the embodiments of the current invention. The UE receives SS1 from eNB within the default anchor carrier for timing synchronization in step 701. In step 702, after successful detection of SS1, UE receives SS1 from eNB within the default anchor carrier for frequency synchronization. In step 703, with successful detection of SS1/SS2, UE performs demodulation for NR_MIB within the buffer for at least NR_MIB/SS2 storage. In step 704, obtaining the fundamental system configuration information from NR_MIB (e.g., system bandwidth, anchor carrier bandwidth, NR_ESI control information). In step 705, UE receives and demodulates NR_ESI for obtaining the essential system configuration information (e.g., RACH information, common channel configuration, paging information). In step 706, UE performs RACH procedure to establish a RRC connection, and then in step 707, UE obtains NON-ESI message carried in msg4 during RACH procedure, or by sending NON-ESI request to obtain NON-ESI information. FIG. 8 illustrates an exemplary flow chart for the cell access over the anchor carrier in accordance with embodiments of the current invention. At step 801, the UE configures an anchor carrier with a system bandwidth in a wireless system with new RAT (NR), wherein the anchor carrier carries information and signal for cell access. At step 802, the UE receives control information via narrow-band access at the anchor carrier over a default bandwidth with a default subcarrier spacing, wherein the default bandwidth is smaller than the system bandwidth. At step 803, the UE enables wideband access with a wide-band bandwidth for wide-band control information at the anchor carrier upon detecting one or more wide-band access conditions, wherein the wide-band bandwidth is larger than the default bandwidth and smaller than or equal to the system bandwidth.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    configuring an anchor carrier with a system bandwidth by a user equipment (UE) in a wireless system with new RAT (NR), wherein the anchor carrier carries information and signal for cell access;
    receiving control information via narrow-band access at the anchor carrier over a default bandwidth with a default subcarrier spacing, wherein the default bandwidth is smaller than the system bandwidth; and
    enabling wideband access with a wide-band bandwidth for wide-band control information at the anchor carrier upon detecting one or more wide-band access conditions, wherein the wide-band bandwidth is larger than the default bandwidth and smaller than or equal to the system bandwidth.

2. The method of claim 1, wherein the default subcarrier spacing is a minimum subcarrier spacing of numerologies supported by the wireless system determined by one or more parameters comprising a frequency band default subcarrier, and a deployment scenario.

3. The method of claim 1, wherein the information and signal carried in the anchor carrier comprises at least one of time synchronization signal SS1, frequency synchronization signal SS2, reference signal (RS), NR master information block (NR_MIB), NR essential system information (NR_ESI), paging, and Non-ESI.

4. The method of claim 3, wherein SS1, SS2, RS are received over the default bandwidth.

5. The method of claim 4, one or more control information are received over the default bandwidth comprising NR_MIB, and NR_ESI.

6. The method of claim 3, wherein the NR_ESI comprises at least one of the frequency resources associated with the used numerology and the service type.

7. The method of claim 3, the Non-ESI information is received through one of Non-ESI carriers comprising a Msg4 during RACH access procedure, a dedicated channel for the UE as a user specific data scheduled by a SI-response message, and a broadcast data with a default or configurable period indicated for transmission by a SI-response message.

8. The method of claim 1, wherein the wideband access is triggered by an indicator in a NR_MIB.

9. The method of claim 1, further comprising receiving system information (SI) update information.

10. The method of claim 9, wherein the SI update information is received via a broadcast SI-paging message.

11. The method of claim 9, wherein the SI update information is received via a SI-response message in response to a SI-request message sent by the UE in a connected state.

12. A user equipment (UE) comprising:
    a transceiver module that transmits and receives radio signals in a wireless network with new RAT (NR);
    a configuration circuit that configures an anchor carrier with a system bandwidth, wherein the anchor carrier carries information and signal for cell access;
    a narrow-band access circuit that receives control information via narrow-band access at the anchor carrier over a default bandwidth with a default subcarrier spacing, wherein the default bandwidth is smaller than the system bandwidth; and
    a wideband access circuit that enables wideband access with a wide-band bandwidth for wide-band control information at the anchor carrier upon detecting one or more wide-band access conditions, wherein the wide-band bandwidth is larger than the default bandwidth and smaller than or equal to the system bandwidth.

13. The UE of claim 12, wherein the default subcarrier spacing is a minimum subcarrier spacing of numerologies supported by the wireless system determined by one or more parameters comprising a frequency band default subcarrier, and a deployment scenario.

14. The UE of claim 12, wherein the information and signal carried in the anchor carrier comprises at least one of time synchronization signal SS1, frequency synchronization signal SS2, reference signal (RS), NR master information block (NR_MIB), NR essential system information (NR_ESI), paging, and Non-ESI.

15. The UE of claim 14, wherein SS1, SS2, RS are received over the default bandwidth.

16. The UE of claim 15, one or more control information are received over the default bandwidth comprising NR_MIB, and NR_ESI.

17. The UE of claim 14, wherein the NR_ESI comprises at least one of the frequency resources associated with the used numerology and the service type.

18. The UE of claim 14, wherein the Non-ESI information is received through one of Non-ESI carriers comprising a Msg4 during RACH access procedure, a dedicated channel for the UE as a user specific data scheduled by a SI-response message, and a broadcast data with a default or configurable period indicated for transmission by a SI-response message.

19. The UE of claim 12, wherein the wideband access is triggered by an indicator in a NR_MIB.

20. The UE of claim 12, further comprising a system information (SI) update circuit that receives SI update information.

21. The UE of claim 20, wherein the SI update information is received via a broadcast SI-paging message.

22. The UE of claim 20, wherein the SI update information is received via a SI-response message in response to a SI-request message sent by the UE in a connected state.

* * * * *